Oct. 9, 1945.         R. F. SHIPMAN         2,386,637
WEIGHING SCOOP
Filed Dec. 30, 1944

INVENTOR.
RAYMOND F. SHIPMAN
BY A. D. T. Libby
attorney

Patented Oct. 9, 1945

2,386,637

UNITED STATES PATENT OFFICE 2,386,637

WEIGHING SCOOP

Raymond F. Shipman, Kearny, N. J., assignor of one-half to Fred A. Cummings, Maybrook, N. Y.

Application December 30, 1944, Serial No. 570,572

11 Claims. (Cl. 265—67)

This invention relates to the construction of a weighing scoop used for weighing materials, wherein the scoop is adapted for use especially in the handling of grain.

It is the object of my invention to provide several improvements over the construction shown in my Patent 1,913,296, issued June 6, 1933, and the prior art which came to my attention while the application of said patent was pending.

The advantage of my present construction is that the spring is positioned on the scoop so that it will be substantially over the center of the load or weight carried by the scoop, whereby the handle—the inner end of which is fastened to the outer end of the spring—is also positioned over the scoop for a considerable distance, thereby making it easier to handle and shortening the entire structure with a resulting reduction in weight and cost.

In my present method of mounting the spring, the height of the structure is also reduced.

Another advantage is derived from my present method of mounting the downwardly extended portion of the handle. The link members connecting this portion of the handle are attached to the closure end of the scoop in such a manner as to cover the pivots, thereby preventing grain or other material from getting onto the pivots and thereby affecting the operation of the structure.

A further advantage is derived from the fact that the spring is completely enclosed, and this enclosure is provided with stop means so that the spring cannot be injured by an overload.

Other and further advantages will be discerned from a study of the specification taken in connection with the annexed drawing, wherein.

Figure 1:
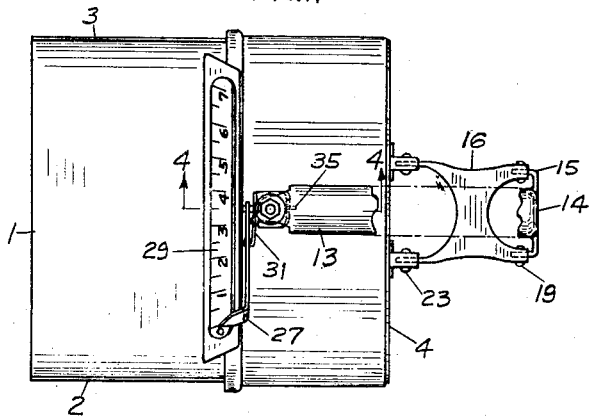
Figure 1 is a plan view of my improved type of weighing scoop, one portion of the handle being broken away to show the link members connecting it to the scoop.
Figure 2:
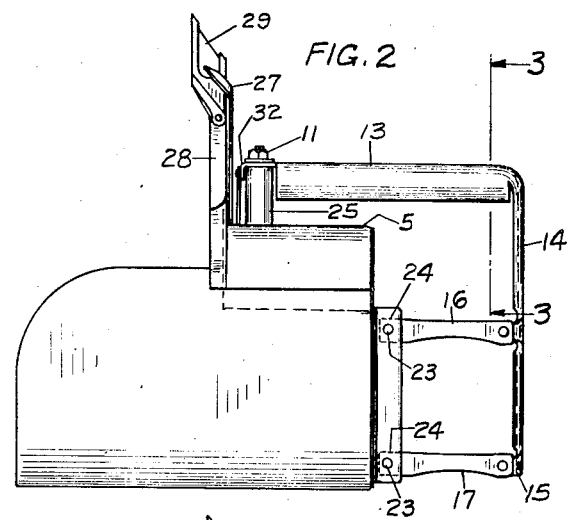
Figure 2 is a side view of the structure.
Figure 3:
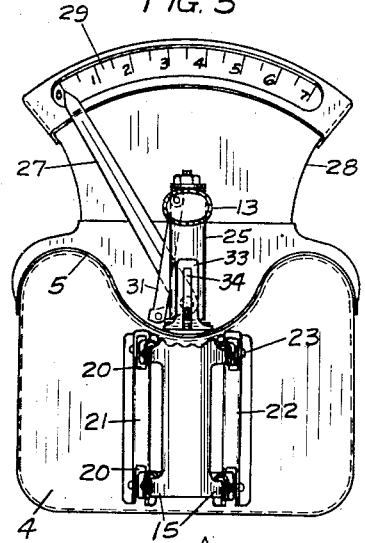
Figure 3 is a view of Figure 2, looking from right to left, a certain portion being in section as indicated by the line 3—3.
Figure 4:
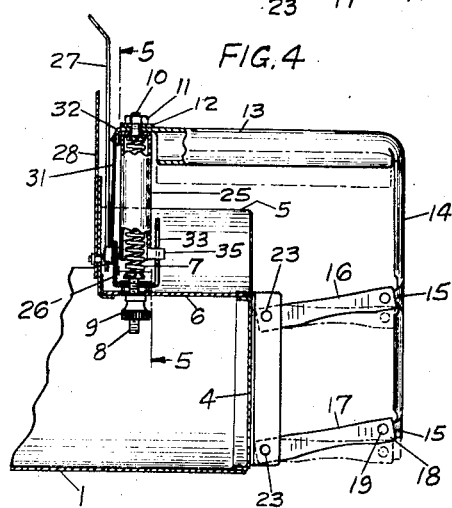
Figure 4 is a view on the line 4—4 of Figure 1.
Figure 5:
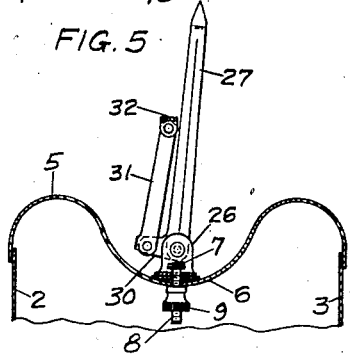
Figure 5 is a view on the line 5—5 of Figure 4.

In the various views, wherein like numbers refer to corresponding parts, the weighing scoop is provided with a bottom 1 with side members 2 and 3 and a closure end 4. Extending from the closure end 4 forwardly between the side members 1 and 2, is a cover 5 which, as shown more particularly in Figures 3 and 5, has a depressed portion 6. Mounted on the median line of this depressed portion 6, is a spring 7 having one end fastened to a stud 8 which passes through the portion 6 and is engaged by an adjusting nut 9, whereby the tension of the spring may be adjusted. The upper end of the spring is fastened by a stud 10, nut 11 and washer 12 to the inner end of a handle 13, the outer end of which has a downwardly extending portion 14 having oppositely disposed spaced ears 15 to which are pivotally mounted spaced link members 16 and 17 preferably made from a piece of sheet metal having downwardly extending sides 18 to embrace the ears 15 and being pivoted by pins 19 thereto.

The opposite ends of the link members 16 and 17 have projections 24 passing into slots 20 cut or formed into the web of channel-shaped members 21 and 22 that are fastened in any satisfactory manner as by rivets or spot-welding to the closure end 4. The inwardly projecting ends 24 are pivoted by pins 23 to the channel-shaped members 21 and 22 and, as will be seen, these pivots are substantially covered to prevent grain or other material from getting onto the pivots and affecting the operation of the scoop.

Preferably the handle 13 and its downwardly extending portion 14 is made all in one piece as may be done where sheet metal, such as steel or an alloy thereof, is used.

In order to protect the spring 7 from injury of any sort, I provide a cylindrical cover 25 therefor, the cover being clamped to the inner end of the handle 13 so as to move therewith. The spring stud 8 is positioned in a U-shaped bracket, one arm 26 of which serves as a support for a stud on which a pointer 27 is mounted, the other end of the pivot stud being carried by a dial plate 28. As shown in the drawing, the dial plate is made in two pieces, but preferably it should be made in one piece and riveted or spot-welded to the side members 2 and 3 of the scoop; or it may be formed as a part of the cover 5. The upper end of the dial plate 28 is provided with a scale 29 that is calibrated in pounds and fractions thereof. The pointer 27 is connected by an arm 30 to a link 31 which is preferably integral with the arm 30. The upper end of the link 31 is fastened to a lug 32 preferably integral with the handle 13.

The other arm 33 of the U-shaped bracket is provided with a slot 34 to receive a finger 35 that is fastened to or formed integral with and projects from the spring cover 25. The length of the slot 34 is such as to stop the extension of the spring and movement of the pointer directly after the full length of the scale has been covered by the pointer, thereby protecting the spring from an undue strain.

By having the spring positioned in the depressed portion 6 of the cover 5, the height of the structure is materially reduced and, furthermore, the spring is positioned so as to be substantially over the center of gravity of the load carried by the scoop; and since the handle extends over the cover portion of the scoop, the scoop with its load is much more easily handled than in the structure of my patent previously referred to, wherein the handle is out beyond the end of the scoop.

From the preceding description, it should be evident that I have provided a weighing scoop that has many advantages over prior-art constructions.

What I claim is:

1. A weighing scoop including a channel-shaped body having a closure end, a pair of channel members fastened to the closure end in spaced relation, each channel member having openings in their webs at their opposite ends, spaced link members having ends extending through said web openings into the channels and pivotally anchored thereto, a handle having an extension at one end extending downwardly, this end having inwardly projecting ears pivotally connected to the ends of said link members opposite to the ends entering said channel members, a cover extending from the closure end over a substantial part of the scoop body, a dial plate carrying a dial or scale extending upwardly from the body at the inner edge of the cover, a vertically disposed coil spring fastened at one end to the cover closely adjacent the dial plate, the opposite end of the spring being fastened to the free end of the handle, and being the sole connecting means between the scoop and the free end of the handle, a pointer pivotally mounted closely adjacent the spring and extending in cooperative relation with the dial or scale, and link means connected between the pointer and the junction of the spring and handle.

2. A weighing scoop as set forth in claim 1 further characterized in that the spring fastening to the cover is adjustable and the spring has a casing normally enclosing it but movable with the handle.

3. A weighing scoop as set forth in claim 1, further characterized in that the spring is mounted on a U-shaped bracket fastened to the cover, the pointer being pivoted between one arm of the U and the dial plate, while the other arm of the U is slotted from its lower end upwardly to an extent sufficient to provide movement for a stop and the spring cover has a stop finger movable within the slot.

4. A weighing scoop as set forth in claim 1, further characterized in that the closure end and cover have centrally located downwardly curved portions, with the spring and associated parts located on the median line of the downwardly curved portion of the cover for the purpose described.

5. A weighing scoop having a bottom with upturned sides and a closure end, a cover fastened to the sides and extending from the closure end forwardly a considerable distance, a vertically positioned coil spring mounted on the cover near its forward edge, a plate extending upwardly from the inner edge of the cover and carrying a scale, a pointer pivotally mounted adjacent the lower end of the spring with link means connecting the pivoted end to the inner end of an L-shaped handle, with one arm of the handle fastened to the upper end of the spring and to said link means and extending rearwardly over the cover and having its other arm turned downwardly, spaced link members pivotally attached to said downwardly turned handle part and to the closure end.

6. A weighing scoop as set forth in claim 5, further characterized in that the lower end of the spring is embraced by a U-shaped bracket, one arm of which acts as one support for the pointer pivot, while the other arm is slotted to receive a stop finger on a cover which extends over the spring and is fastened to the free end of the handle for movement therewith.

7. A weighing scoop as set forth in claim 5, further characterized in that the scoop cover has a centrally depressed portion wherein the spring is located for the purpose described.

8. A weighing scoop as set forth in claim 5, further characterized in that the scoop cover has a centrally depressed portion wherein the spring is located, and the spaced link members extending between said downwardly turned handle part and the closure end are attached to said end by means which covers the pivots for the purpose described.

9. A weighing scoop having a bottom with upturned sides and a closure end, a cover over the rear end of the scoop and extending forwardly, a vertically positioned coil spring mounted on the cover at a point substantially over the center of gravity of the load carried by the scoop, an L-shaped handle having one arm thereof fastened to the upper end of the spring and extending rearwardly over and beyond the cover and having a downwardly extending arm pivotally connected by link members to the closure end, a pointer operatively connected to the inner end of the rearwardly extending handle arm and a scale mounted to cooperate with the pointer.

10. A weighing scoop as set forth in claim 9, further characterized in that the cover has a centrally depressed portion and the spring is adjustably mounted on the median line of this depressed portion, and the spring has a cylindrical cover movable with the spring attached end of the handle.

11. A hand weighing scoop having upturned sides and a closure end, a helical type spring vertically positioned on the scoop at a point substantially over the location of the center of gravity of the load to be carried by the scoop, a cover fastened to the sides and extending from the closure end forwardly a distance sufficient to support the lower end of said spring, means for supporting the bottom of the spring on the cover, a handle having one end fastened to the top of the spring and extending rearwardly from and substantially at right angles to the axis of the spring and beyond the closure end of the scoop, the extended rear end having a downwardly extending portion with means for pivotally supporting said portion on the closure end, a pointer operatively connected to the handle at the spring end thereof and a scale mounted to cooperate with the pointer.

RAYMOND F. SHIPMAN.